(12) United States Patent
Szablewski

(10) Patent No.: US 7,794,012 B2
(45) Date of Patent: Sep. 14, 2010

(54) BACKREST FOR A VEHICLE SEAT

(75) Inventor: Piotr Szablewski, Wuppertal (DE)

(73) Assignee: Brose Fahrzeugteile GmbH & Co. Kommanditgesellschaft, Hallstadt, Hallstadt (DE)

( * ) Notice: Subject to any disclaimer, the term of this patent is extended or adjusted under 35 U.S.C. 154(b) by 0 days.

(21) Appl. No.: 11/899,936

(22) Filed: Sep. 7, 2007

(65) Prior Publication Data
US 2008/0111407 A1 May 15, 2008

Related U.S. Application Data

(63) Continuation of application No. PCT/EP2006/002125, filed on Mar. 8, 2006.

(30) Foreign Application Priority Data

Mar. 8, 2005 (DE) .................. 10 2005 010 594

(51) Int. Cl.
*B60N 2/42* (2006.01)
*B60N 2/48* (2006.01)
*B60R 21/01* (2006.01)
*B60R 21/055* (2006.01)

(52) U.S. Cl. ................................. 297/216.12
(58) Field of Classification Search ............ 297/216.12
See application file for complete search history.

(56) References Cited

U.S. PATENT DOCUMENTS

| 5,466,001 | A | * | 11/1995 | Gotomyo et al. .... 297/216.12 X |
| 5,848,661 | A | | 12/1998 | Fu et al. |
| 5,975,637 | A | * | 11/1999 | Geuss et al. ........ 297/216.12 X |
| 6,042,145 | A | | 3/2000 | Mitschelen et al. |
| 6,088,640 | A | * | 7/2000 | Breed ............... 297/216.12 X |
| 6,331,014 | B1 | * | 12/2001 | Breed ............... 297/216.12 X |
| 6,402,195 | B1 | | 6/2002 | Eisenmann et al. |
| 6,607,242 | B2 | * | 8/2003 | Estrada et al. ......... 297/216.12 |
| 6,746,078 | B2 | * | 6/2004 | Breed .................. 297/216.12 |
| 6,805,404 | B1 | * | 10/2004 | Breed .................. 297/216.12 |
| 7,243,945 | B2 | * | 7/2007 | Breed et al. ............... 280/735 |
| 2003/0015898 | A1 | * | 1/2003 | Breed .................. 297/216.12 |
| 2005/0264051 | A1 | * | 12/2005 | Lawall et al. .......... 297/216.12 |
| 2006/0186713 | A1 | * | 8/2006 | Breed .................. 297/216.12 |

(Continued)

FOREIGN PATENT DOCUMENTS

DE 32 40 294 A1 10/1982

(Continued)

*Primary Examiner*—Rodney B White
(74) *Attorney, Agent, or Firm*—Alix, Yale & Ristas, LLP

(57) ABSTRACT

The present disclosure relates to a backrest for vehicle seat, with a head support (1) which is adjustable in terms of height with respect to the backrest, and with a sensor arranged in the head support (1) and intended for detecting the position of the head of a person sitting on the vehicle seat in relation to the head support (1) and for indicating an adjusted end position, in the head support (1) at least two sensors being arranged, designed as capacitive proximity sensors (5, 14), which indicate the position of the head support (1) with respect to the head (P) as a function of the detected capacitances which are to be found as a capacitance on the electrodes formed by the head (P) and one of the at least two proximity sensors (5, 14) each.

21 Claims, 2 Drawing Sheets

U.S. PATENT DOCUMENTS

2007/0273524 A1* 11/2007 Lee et al. .................. 340/572.1
2008/0042477 A1* 2/2008 Breed .................... 297/216.12

FOREIGN PATENT DOCUMENTS

| | | | |
|---|---|---|---|
| DE | 37 30 210 A1 | 9/1987 |
| DE | 44 09 046 A1 | 3/1994 |
| DE | 199 16 804 C1 | 4/1999 |
| EP | 1375246 A | 1/2004 |

* cited by examiner

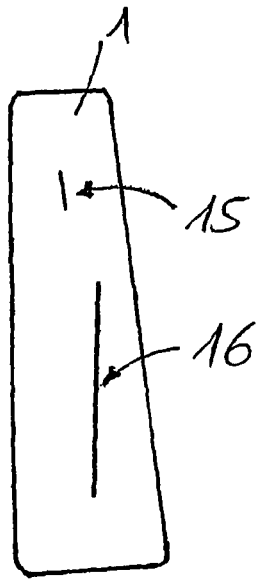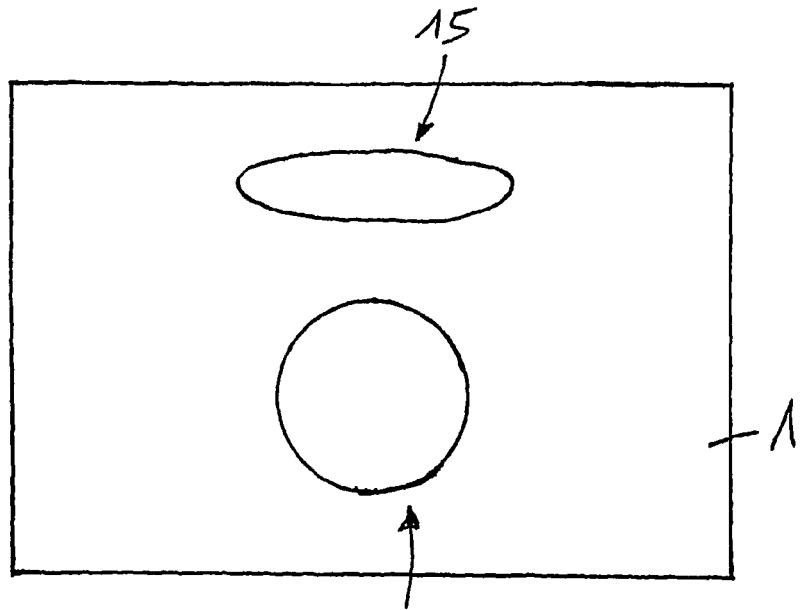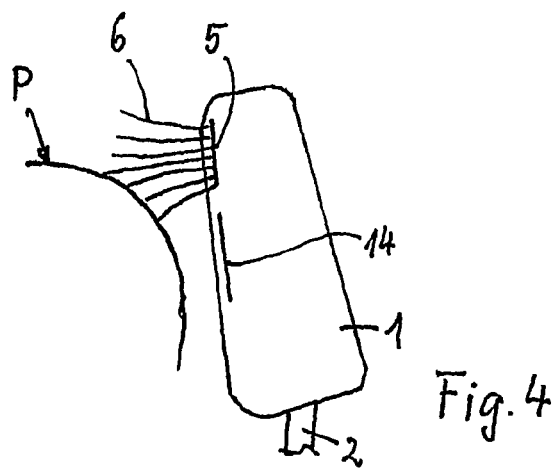

BACKREST FOR A VEHICLE SEAT

This is a Continuation of International Application No. PCT/EP2006/002125, filed Mar. 8, 2006, designating the U.S. under 35 USC §§120 and 365(c), which claims priority from German Application No. 10 2005 010 594.7 filed Mar. 8, 2005 under 35 USC §119.

BACKGROUND

The present invention relates to a backrest for a vehicle seat.

DE 199 16 804 C1 discloses a device for adjusting a vehicle head support with respect to the head position of a passenger, with a sensor arranged in the head support and intended for detecting the head position. The sensor contains two capacitor plates which are arranged one above the other and are part of a capacitor in which the head of the passenger acts as a dielectric. Since there are people with more or less pronounced backs of the head or with necks of greater or lesser thickness, an adjustment of the head support is not possible in this way.

SUMMARY

The object of the invention, therefore, is to provide a backrest for the vehicle seat which allows an improved setting of the head support.

A backrest for a vehicle seat is provided, having a head support which is adjustable in its position with respect to the backrest, in order to adjust the head support in terms of height and of distance for a person sitting on the vehicle seat. The at least two capacitive proximity sensors used for this purpose each form a capacitor with the person's head. These capacitors therefore each consist essentially of the head electrode and of the respective electrode of one of the at least two capacitive proximity sensors. By the capacitance of the capacitors being detected, the head support can be adjusted. The position of the head support with respect to the head is indicated, so that the head support can be oriented into an adjusted end position which is optimal in terms of height and the distance from the head. An accident-compatible setting of the head support can thereby be achieved.

Preferably, a variation in the capacitance is detected, in order to adjust the head support as a function of this variation. The capacitances of each of the capacitors consisting essentially of head and of proximity sensor thus serve as a measure of the adjustment. In this case, the capacitances of the capacitors can be compared with one another.

It is preferred, in this case, that the at least two capacitive proximity sensors each have an electrode, of which the geometric dimensions and predetermined capacitances to be detected form a "field image" which can copy a head portion in order to adjust the height of the head support and the distance of the head support from the person's head. The field image of the at least two capacitive proximity sensors is undirected without the presence of the head. In the presence of a head, the field lines are directed, and a capacitance of the at least two capacitive proximity sensors is established with the head, this capacitance being used to indicate an adjusted end position or as an adjustment for a drive into the adjusted end position.

A control provided for actuating a drive for adjusting the head support can compare the detected capacitances as actual quantities with at least one predeterminable desired quantity of the capacitance for an adjusted end position of the head support. For this purpose, the control may have signal treatment and signal processing electronics. In order to achieve the adjusted end position of the head support, the head support may execute a selectable search run.

The control may have a calibration unit which takes into account external parameters, such as material, atmospheric moisture, etc., which codetermine the capacitance between head and proximity sensor. There may be provision for the calibration unit to carry out calibration when the vehicle is unlocked and it is at the same time established that the vehicle seat is not occupied. The zero line of the capacitors or the reference capacitance may preferably then be calibratable, since there is no backplate electrode for the capacitive proximity sensors on the vehicle seat. The unlocking of the vehicle relates in this case to the exchange of information for access authorization which may take place, for example, mechanically, by radio actuation or by "keyless-go".

Furthermore, it is preferred that compensation for the capacitors be provided by means of a temperature characteristic curve which takes into account the variations in capacitance due to temperature fluctuations. For this purpose, temperature measurement in the interior of the vehicle may be used in order to vary a desired quantity of the capacitance as a function of the temperature.

Preferably, the calibration unit may be configured for determining the capacitance of a capacitor formed by the at least two proximity sensors. The determination of the capacitance of the capacitor formed from the at least two proximity sensors is preferably carried out when the vehicle is unlocked and at the same time it is established that the vehicle seat is not occupied. Thus, the influence of materials in and on the head support, such as different foams, plastics or various other materials, can be taken into account in a calibration, without a person being located on the vehicle seat.

In summary, the head support can be moved out of an initial position, in order to obtain a measure of the position of the head support in relation to the head by means of the capacitances of the capacitors consisting essentially of the head, as one electrode, and the respective electrode of one of the at least two proximity sensors, as the other electrode. By means of the capacitive proximity sensor, a kind of electrical template can be generated on the head support and the head support can be moved until the head fits into the electrical template. The fitting of the electrical template is determined in that specific predeterminable capacitances of the capacitors are detected, which are a function of the distance and position of the head in relation to the electrode of the at least two proximity sensors.

BACKGROUND OF THE DRAWINGS

A more detailed disclosure is set forth below with reference to the accompanying diagrammatic depictions of exemplary embodiments, wherein FIG. 1 shows diagrammatically an embodiment of a backrest with a head support of a vehicle seat;

FIG. 2 shows diagrammatically, in profile, a sectional illustration of the form and position of a capacitive proximity sensor in the head support of the embodiment according to FIG. 1;

FIG. 3 shows diagrammatically a front view of the head support according to FIG. 2 in a partial sectional illustration; and FIG. 4 shows an additional embodiment diagrammatically and in the form of a detail.

DETAILED DESCRIPTION

Figure 1:
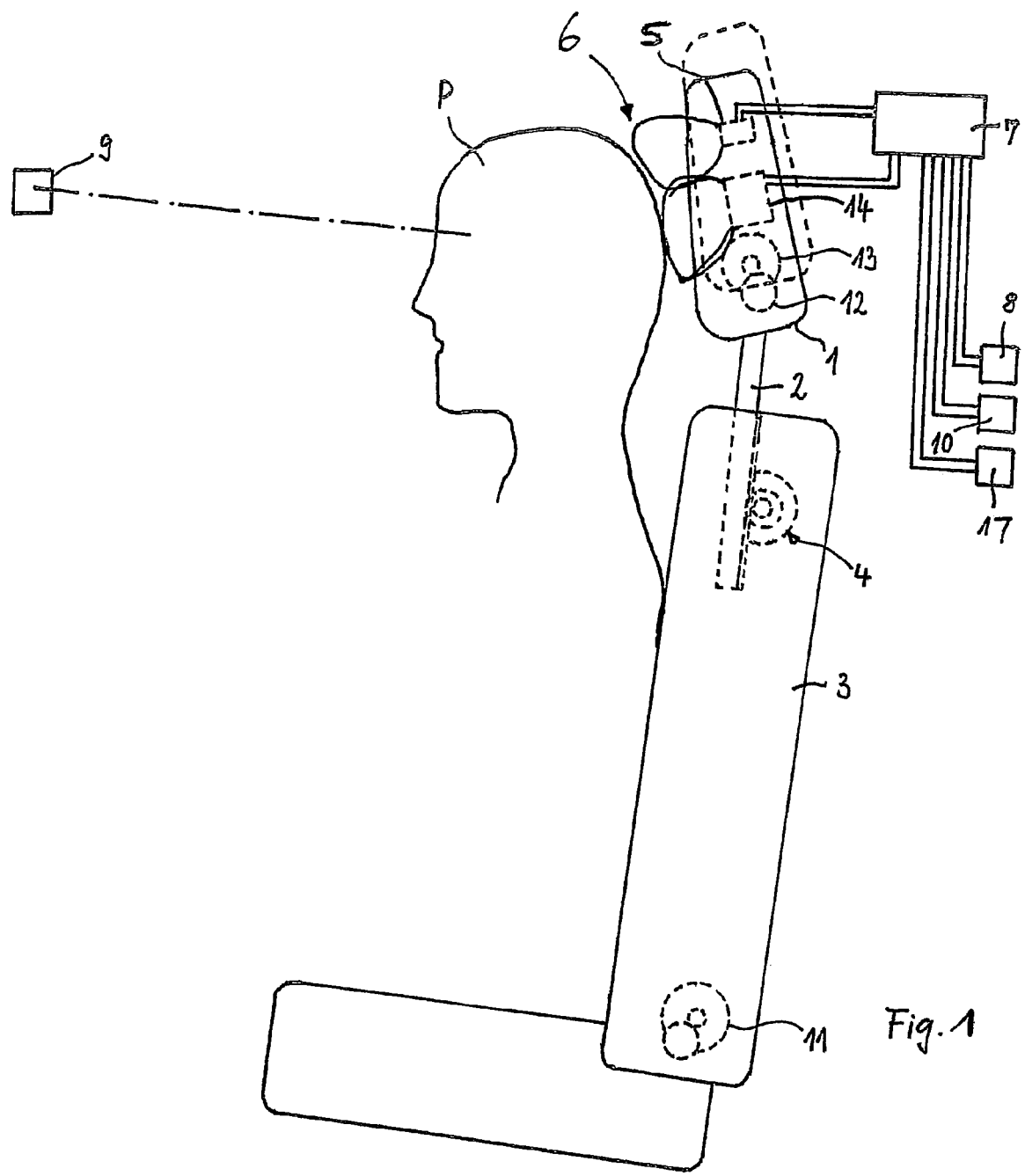

FIG. 1 shows a backrest 3 for a vehicle seat, with a head support 1 which is adjustable in terms of height with respect to the backrest 3, here the backrest of a vehicle seat. Two sensors for detecting the position of the head P of a person sitting on the vehicle seat in relation to the head support 1 and for controlling a drive 4 are provided in the head support 1. The drive 4 moves the head support 1 out of an initial position into an adjustable end position. The head support 1 is thereby to be adapted to different persons who may take their place on the vehicle seat. For this purpose, the sensors arranged in the head support 1 are capacitive proximity sensors 5, 14 which are triggered as a function of the detected respective capacitance which is to be found on the electrodes formed by the head P and the proximity sensors 5, 14. The detected capacitances serve for controlling the drive 4. The proximity sensor 5 detects a variation in the capacitances during the adjustment of the head support 1.

So that the capacitances can be determined as a function of the form of the head, the capacitive proximity sensors 5, 14 each have an electrode, the geometric dimensions of which form a field image 6 copying a head portion.

To control the drive 4, a control 7 is provided which compares detected capacitances as actual quantities with at least one predeterminable desired quantity of the capacitances for an adjusted end position.

The predeterminable desired quantity may be assigned to the adjusted end position. In order to reach this adjusted end position, the drive 4 may be actuable by means of a control 7 in such a way that the head support 1 executes a selectable search run.

Additionally or alternatively to an automatic adjustment of the head support 1 by means of a drive 4, there may be provision for the position of the head support 1 to be indicated with respect to the head of the person P sitting on the vehicle seat. The detected capacitances may serve, as actual quantities in comparison with at least one predeterminable desired quantity of the capacitances in the indication, as a measure of the position of the head support 1 with respect to the head in terms of distance and height.

As is evident particularly from FIG. 2, proximity sensors 5, 14 may have electrodes 15, 16 shaped toward the head. If two electrodes 15, 16 are provided, as illustrated in FIG. 2, these are preferably oriented toward the head P at an inclination to one another. The control 7 may have signal treatment and signal processing electronics. Furthermore, a calibration unit may be provided.

In the embodiment illustrated in FIG. 1, a head support 1 is guided height-adjustably in a backrest 3 of the vehicle seat, for example of a motor vehicle seat, via guide rods 2 by means of a drive 4 which may be electrical, pneumatic or hydraulic. A person P leans with his back against the front side of the backrest 3, while, ideally, the head P of the person is to be located, with its region nearest the head support 1, approximately in the middle of the head support 1 and at an optimal distance from this, that is to say so as not to bear against it. Expediently, in this case, the head support 1 is arranged so as to be inclined in the direction of the head of the person P sitting on the vehicle seat or to the front side of the backrest 3.

In the front part of the head support 1, that is to say the part facing the head, two capacitive proximity sensors 5, 14 are arranged, having a field image 6 which is adapted to an average profile of the back of a human head. The field image 6 is adapted to the theoretical profile of the back of a human head by means of the form and position of the electrodes of the proximity sensors 5, 14 and a capacitance assigned to each of the proximity sensors 5, 14.

An electrode 15, 16 associated with each of the proximity sensors 5, 14 is one electrode of a capacitor and the head of the person P sitting on the vehicle seat is a further electrode of the capacitor. The capacitance of the capacitor depends essentially only on the geometric dimensions and the arrangement of the electrodes, that is to say the head of the person P and the electrode 15, 16 of the proximity sensors 5, 14, with respect to one another. The proximity sensors 5, 14 detect the capacitance which is to be found on the electrodes 15, 16 of the proximity sensors 5, 14, each being one electrode of the capacitor formed with the head.

More precisely, the person P sitting on the vehicle seat forms with the electrodes 15, 16 of the proximity sensors 5, 14 one capacitor each. This results in a capacitance, the size of which is measured.

Since the proximity sensors 5, 14 with their respective electrodes 15, 16 are adapted to the profile of the back of the head of the person P, the capacitances of the capacitors are a measure of the mispositioning and/or adjustment of the head support 1. In the case of the specific capacitance predetermined for the respective proximity sensor 5, 14, the corresponding proximity sensor 5, 14 is triggered. When both proximity sensors 5, 14 of FIG. 1 are triggered, an adjusted end position is reached. A mispositioning or, in general, the position of the head of the person P sitting on the vehicle seat may be indicated from a comparison between the instantaneous detected capacitance of the proximity sensor 5, 14 and the predetermined capacitance for the adjusted end position. The indication of the position of the head in terms of height and distance may take place separately.

The proximity sensors 5, 14 are connected to the control 7 which is accommodated, for example, in the backrest 3 or in the head support 1 or even elsewhere and by means of which the drive 4 can be activated correspondingly.

In order to set optimally the distance of the head support 1 with respect to the distance of the head of the person P, the backrest 3 may, if appropriate, also be divided horizontally, in which case the two parts, of which the upper carries the head support 1, may be adjustable in inclination with respect to one another.

Via the control 7, an optimal setting of the head support 1 may take place in such a way that both the height and the distance from the head are optimized, if appropriate iteratively, independently of the position of the backrest 3 (but insofar as the inclination of the latter allows a setting at all). For this purpose, the head support 1 may also be movable in translation, instead of an adjustment of the inclination of the head support 1 in the direction away from the head or toward the head of the person P, so that the distance from the head support 1 can be set. Alternatively, the head support 1 may be pivotable in sleeves on the backrest 3.

In order to set the head support 1 individually to a person taking his place on the vehicle seat, as a rule, an activation switch 8 is to be actuated since, if the user is unchanged, a renewed setting is not required. Activation causes a movement of the head support 1 in terms of height until the specific predetermined capacitances are detected in the control 7. The adjustment of the head support 1 is terminated at this point.

If the proximity sensor 5 does not respond during the movement of the head support 1 in terms of height, that is to say if it is established that the head support 1 cannot be brought into an optimal position with respect to the head by height adjustment, the head and/or the backrest 3 are/is in an obviously unfavorable inclination position. For the first instance, an (indicator) element 9 to be looked at by the person P may be provided, in order to bring the head into a corresponding position. For the second instance, an indicator may be provided which signals to the person P that he must adjust the backrest 3 correspondingly by hand or by the actuation of a switch (touch-contact switch) 10 for a drive 11, and/or an automatic motor adjustment, controllable via the control 7, of the backrest 3 may be provided, until the optimal position of the head support 1 with respect to the head of the person P is reached and the specific predetermined capacitance is detected in the control 7.

In the event that the inclination of the head support 1 is not adjustable, it is advantageous, in any case, if it is arranged so as to be inclined to the front side of the backrest 3 and consequently toward the head.

In the event that the head support 1 can be adjusted only manually, the element 9 can be used as an indicator element for an inappropriate positioning of the head support 1, said indicator element indicating this until the proximity sensors 5, 14 respond and, consequently, the head support 1 is set at the correct height and the correct distance.

The head support 1 is additionally adjustable by means of a drive 13, cf. FIG. 1, or manually about a horizontal axis 12 in its inclination with respect to the backrest 3.

The electrodes 15, 16 are arranged one above the other in terms of the width of the head support 1 centrally with respect to the latter in the head support 1.

The field image 6 obtained from the two electrodes 15, 16 copies the average form of the back of the head of the person P taking his place on the vehicle seat, so that an "electrical template" for the back of the head of the person P is formed, and the capacitance of the two electrodes 15, 16 is a measure of the mispositioning and/or adjustment of the head support 1 as a function of the distance and position of the head as part of the capacitor. In the case of a specific predeterminable capacitance of the proximity sensors 4, 14, these are triggered.

Preferably, the electrodes 15, 16 are set back correspondingly, as compared with that face of the head support 1 which faces the head, so as not to endanger the head in the event of a head impact.

For example, in a motor vehicle, it may happen that the sitting position is changed during a lengthy trip. So that this does not lead basically to a change in the setting of the head support 1, it may be expedient if changes caused thereby in the signals from the electrodes 15, 16 lead to a reaction by the control 7 only after a predetermined time has elapsed.

If appropriate, a memory switch 17, for example in the form of a touch-contact switch, may also be provided, which, after an 'extraneous use' of the seat, makes it possible to return the seat setting to a stored position.

The invention claimed is:

1. A backrest with head support for a vehicle seat, comprising:
   a substantially upright backrest;
   a head support mounted in the backrest and adjustable in height to an end position with respect to the backrest;
   at least two capacitive proximity sensors arranged in the head support for detecting the position of the head of a person sitting in the vehicle seat in relation to the head support; and
   an indicator responsive to proximity signals from the proximity sensors dependent on the proximity of the person's head to the headrest;
   wherein each proximity sensor comprises an electrode in the head support that generates an electric field,
   wherein each proximity sensor detects a distinct capacitance of its electrode in relation to the head, and
   wherein the two proximity sensors produce an indication of the position of the head support with respect to the head as a function of said detected distinct capacitances.

2. The backrest as claimed in claim 1, wherein the at least two capacitive proximity sensors detect an adjustment of the head support by a variation in the capacitance.

3. The backrest as claimed in claim 2, including at least one drive responsive to proximity signals from the proximity sensors commensurate with the proximity of the person's head to the headrest, for adjusting the height of the headrest to said end position dependent on said proximity signals.

4. The backrest as claimed in claim 3, including a control connected to the at least one drive.

5. The backrest as claimed in claim 4, wherein the control has a calibration unit and the calibration unit is connected to a device for detecting an unlocking of the vehicle, and a reference capacitance can be detected for use in indicating the position of the head support with respect to the head, when the vehicle is unlocked.

6. The backrest as claimed in claim 4, wherein the control has signal treatment and signal processing electronics.

7. The backrest as claimed in claim 6, wherein the control has a calibration unit.

8. The backrest as claimed in claim 6, including a device for compensating the respective capacitors by means of a temperature characteristic curve.

9. The backrest as claimed in claim 6, wherein the calibration unit is configured for determining the capacitance of a capacitor formed by the at least two proximity sensors when an unlocking of the vehicle is detected.

10. The backrest as claimed in claim 2, wherein the at least two capacitive proximity sensors each have an electrode, which electrodes together form a field image copying a head portion.

11. The backrest as claimed in claim 10, including a control for at least one drive, which compares detected capacitances as actual quantities with at least one respective predeterminable desired quantity of the capacitance for an adjusted end position.

12. The backrest as claimed in claim 1, including at least one drive responsive to proximity signals from the proximity sensors commensurate with the proximity of the person's head to the headrest, for adjusting the height of the headrest to said end position dependent on said proximity signals.

13. The backrest as claimed in claim 12, including a control connected to the at least one drive.

14. The backrest as claimed in claim 13, wherein the control has signal treatment and signal processing electronics.

15. The backrest as claimed in claim 13, wherein the control has a calibration unit.

16. The backrest as claimed in claim 15, wherein the calibration unit is connected to a device for detecting an unlocking of the vehicle, and a reference capacitance can be detected for use in indicating the position of the head support with respect to the head, when the vehicle is unlocked.

17. The backrest as claimed in claim 12, including a control for at least one drive, which compares detected capacitances as actual quantities with at least one respective predeterminable desired quantity of the capacitance for an adjusted end position.

18. The backrest as claimed in claim 12, wherein the drive can be actuated by means of a control which triggers a selectable search run of the head support.

19. The backrest as claimed in claim 1, wherein the at least two capacitive proximity sensors each have an electrode, which electrodes together form a field image copying a head portion.

20. The backrest as claimed in claim 19, including a control for at least one drive, which compares detected capacitances as actual quantities with at least one respective predeterminable desired quantity of the capacitance for an adjusted end position.

21. The backrest as claimed in claim 1, wherein each proximity sensor contains only one electrode.

* * * * *